US012200808B2

United States Patent
Nam et al.

(10) Patent No.: US 12,200,808 B2
(45) Date of Patent: Jan. 14, 2025

(54) DRX AND WAKE-UP OPERATION BASED ON PREDETERMINED STATE VARIATION

(71) Applicant: QUALCOMM Incorporated, San Diego, CA (US)

(72) Inventors: Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 16/883,353

(22) Filed: May 26, 2020

(65) Prior Publication Data

US 2020/0404735 A1 Dec. 24, 2020

Related U.S. Application Data

(60) Provisional application No. 62/865,062, filed on Jun. 21, 2019.

(51) Int. Cl.
*H04W 76/28* (2018.01)
*H04L 1/00* (2006.01)
(Continued)

(52) U.S. Cl.
CPC ........... *H04W 76/28* (2018.02); *H04L 1/0003* (2013.01); *H04W 24/08* (2013.01);
(Continued)

(58) Field of Classification Search
CPC .................................................... H04W 76/28
See application file for complete search history.

(56) References Cited

U.S. PATENT DOCUMENTS 10,917,847 B2 * 2/2021 Nam ................. H04W 52/0235
11,013,058 B2 * 5/2021 Tang ................. H04W 52/0229
(Continued)

FOREIGN PATENT DOCUMENTS

CN 103108386 A 5/2013
EP 2592893 A1 5/2013
(Continued)

OTHER PUBLICATIONS

"3rd Generation Partnership Project, Technical Specification Group Radio Access Network, NR, Study on UE Power Saving (Release 16)", 3GPP Standard, Technical Report, 3GPP TR 38.840, 3rd Generation Partnership Project (3GPP), Mobile Competence Centre, 650, Route Des Lucioles, F-06921 Sophia-Antipolis Cedex, France, No. V2.0.0, May 29, 2019 (May 29, 2019), XP051753900, pp. 1-73, [retrieved on May 29, 2019] pp. 39-56, paragraph 5.1.4.
(Continued)

*Primary Examiner* — Guang W Li
(74) *Attorney, Agent, or Firm* — Guang Y. Zhang; Procopio, Cory, Hargreaves & Savitch LLP

(57) ABSTRACT

A configuration to enable a base station to configure a UE with a sequence of predetermined configuration parameters for DRX operation based on predetermined state changes for the UE, wherein the DRX operation comprises a plurality of DRX cycles. The apparatus may transmit communication to the UE based on the sequence of predetermined configuration parameters for the DRX operation. The UE may receive the configuration from the base station and monitor for communication from the base station based on the sequence of predetermined configuration parameters for the DRX operation.

28 Claims, 13 Drawing Sheets

(51) Int. Cl.
  *H04W 24/08* (2009.01)
  *H04W 52/02* (2009.01)
  *H04W 52/52* (2009.01)
  *H04W 72/044* (2023.01)
(52) U.S. Cl.
  CPC ... *H04W 52/0216* (2013.01); *H04W 52/0229* (2013.01); *H04W 52/52* (2013.01); *H04W 72/046* (2013.01)

(56) References Cited

U.S. PATENT DOCUMENTS

| | | | |
|---|---|---|---|
| 2013/0188503 A1 | 7/2013 | Anepu et al. | |
| 2015/0229639 A1* | 8/2015 | Abdulrahiman | H04L 63/0853 455/411 |
| 2015/0282076 A1* | 10/2015 | Larmo | H04W 36/0088 370/311 |
| 2016/0212794 A1* | 7/2016 | Szabo | H04W 52/0206 |
| 2019/0230569 A1* | 7/2019 | Kim | H04W 88/08 |
| 2019/0320490 A1* | 10/2019 | Liu | H04W 24/10 |
| 2020/0092814 A1* | 3/2020 | Zhou | H04W 52/0235 |
| 2020/0145921 A1* | 5/2020 | Zhang | H04W 76/27 |
| 2020/0296762 A1* | 9/2020 | Sun | H04W 72/046 |
| 2020/0404735 A1* | 12/2020 | Nam | H04W 76/28 |
| 2021/0014927 A1* | 1/2021 | Tang | H04W 76/27 |
| 2021/0050978 A1* | 2/2021 | Manolakos | H04L 5/0048 |
| 2021/0195457 A1* | 6/2021 | Kim | H04L 5/0023 |
| 2021/0219233 A1* | 7/2021 | He | H04W 52/0216 |
| 2021/0314866 A1* | 10/2021 | Lee | H04W 52/0229 |
| 2021/0377857 A1* | 12/2021 | Wu | H04W 52/283 |
| 2022/0124622 A1* | 4/2022 | Islam | H04W 72/542 |
| 2022/0217636 A1* | 7/2022 | Shrivastava | H04L 1/1812 |

FOREIGN PATENT DOCUMENTS

| | | | |
|---|---|---|---|
| EP | 2779745 A1 * | 9/2014 | ........ H04W 36/0088 |
| WO | 2011123744 A1 | 10/2011 | |
| WO | 2018160969 A1 | 9/2018 | |
| WO | 2018203822 A1 | 11/2018 | |

OTHER PUBLICATIONS

International Search Report and Written Opinion—PCT/US2020/034744—ISA/EPO—Aug. 31, 2020.

* cited by examiner

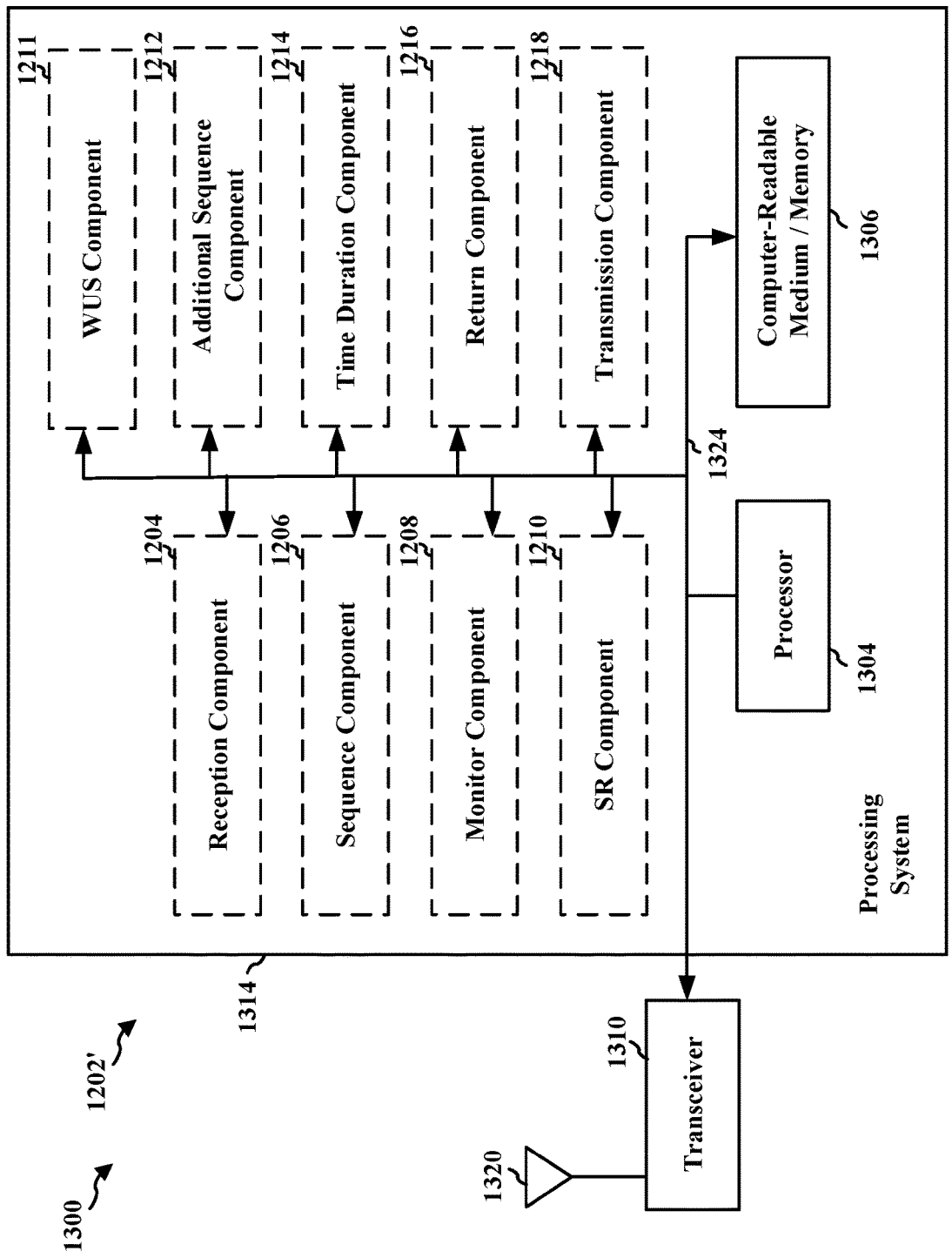

DRX AND WAKE-UP OPERATION BASED ON PREDETERMINED STATE VARIATION

CROSS REFERENCE TO RELATED APPLICATION(S)

This application claims the benefit of U.S. Provisional Application Ser. No. 62/865,062, entitled "DRX and Wake-Up Operation based on Predetermined State Variation" and filed on Jun. 21, 2019, which is expressly incorporated by reference herein in its entirety.

BACKGROUND

Technical Field

The present disclosure relates generally to communication systems, and more particularly, to wireless communication including discontinuous reception (DRX).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a base station. The apparatus configures a user equipment (UE) with a sequence of predetermined configuration parameters for DRX operation based on predetermined state changes for the UE, wherein the DRX operation comprises a plurality of DRX cycles. The apparatus may transmit communication to the UE based on the sequence of predetermined configuration parameters for the DRX operation.

In an aspect of the disclosure, a method, a computer-readable medium, and an apparatus are provided for wireless communication at a UE. The apparatus may receive the configuration from the base station comprising a sequence of predetermined configuration parameters for DRX operation based on predetermined state changes for the UE, wherein the DRX operation comprises a plurality of DRX cycles. The apparatus may monitor for communication from the base station based on the sequence of predetermined configuration parameters for the DRX operation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 13 is a diagram illustrating an example of a hardware implementation for an apparatus employing a processing system.

DETAILED DESCRIPTION

Figure 1:
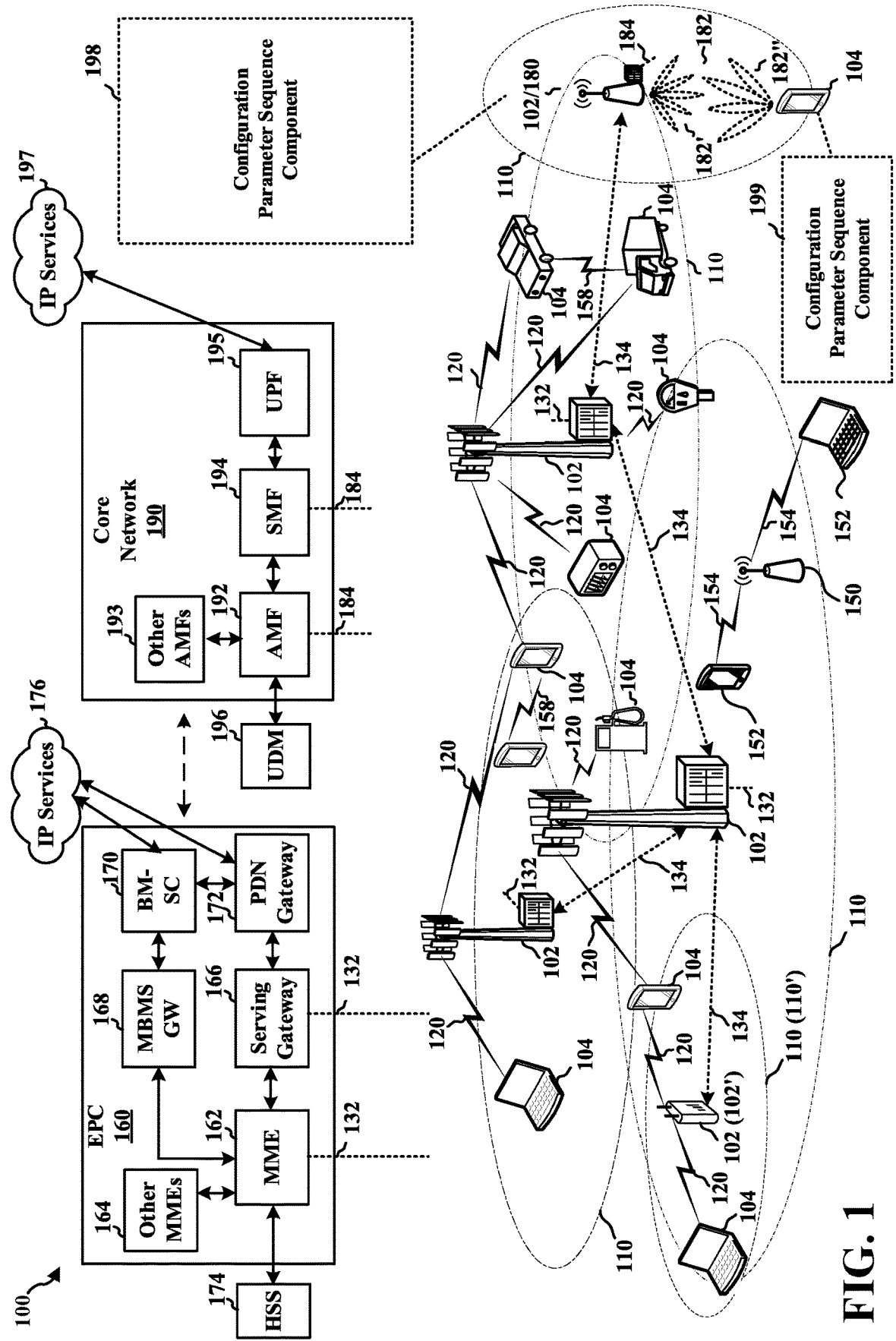
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may comprise a configuration parameter sequence component 198 configured to provide a UE with a sequence of predetermined configuration parameters for DRX operation based on predetermined state changes for the UE, wherein the DRX operation comprises a plurality of DRX cycles.

Referring again to FIG. 1, in certain aspects, the UE 104 may comprise a configuration parameter sequence component 199 configured to receive and apply a configuration from the base station comprising a sequence of predetermined configuration parameters for DRX operation based on predetermined state changes for the UE, wherein the DRX operation comprises a plurality of DRX cycles. The apparatus may monitor for communication from the base station based on the sequence of predetermined configuration parameters for the DRX operation.

Although the following description may be focused on 5G NR, the concepts described herein may be applicable to other similar areas, such as LTE, LTE-A, CDMA, GSM, and other wireless technologies.

Figure 2:
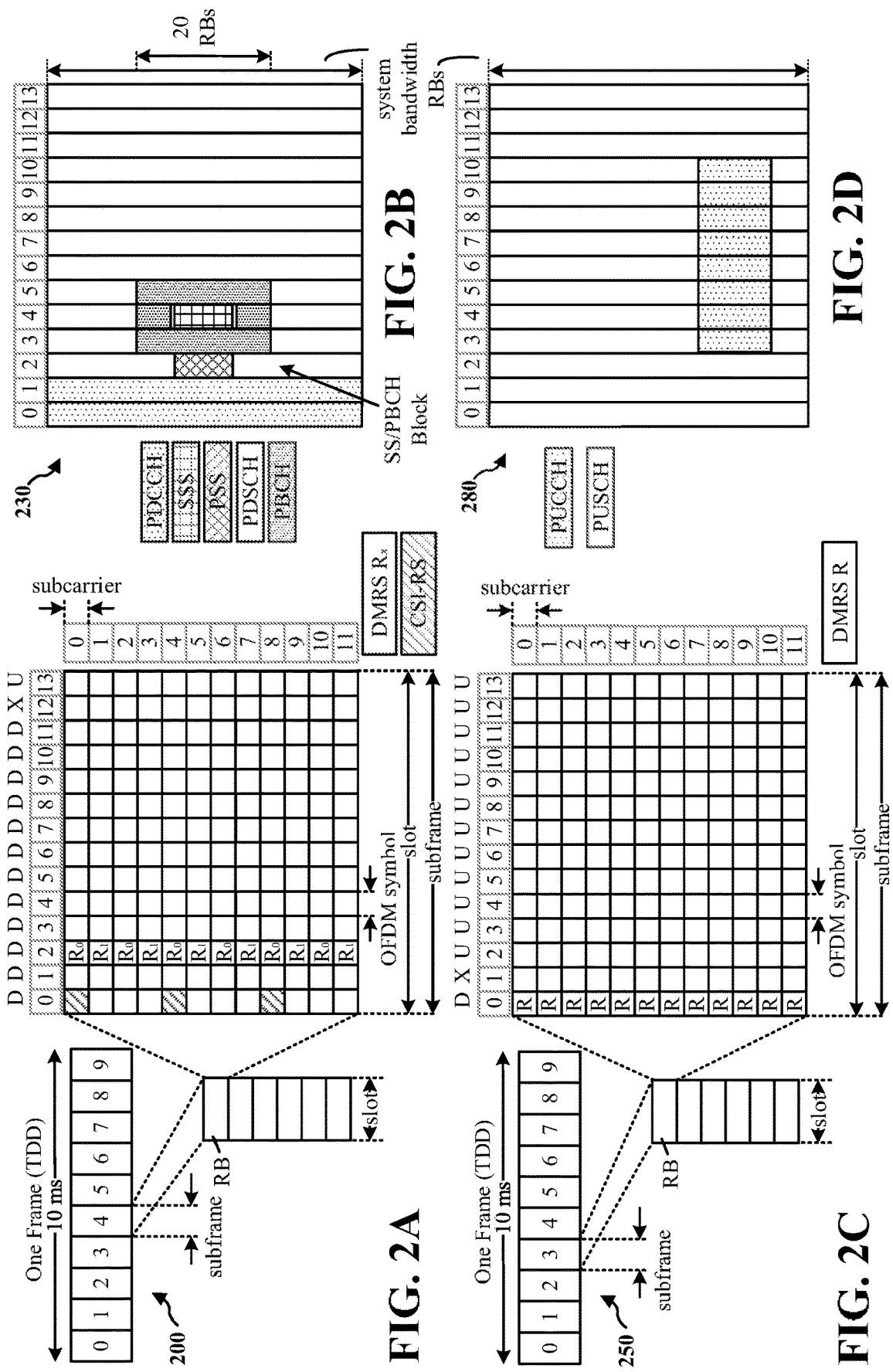
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
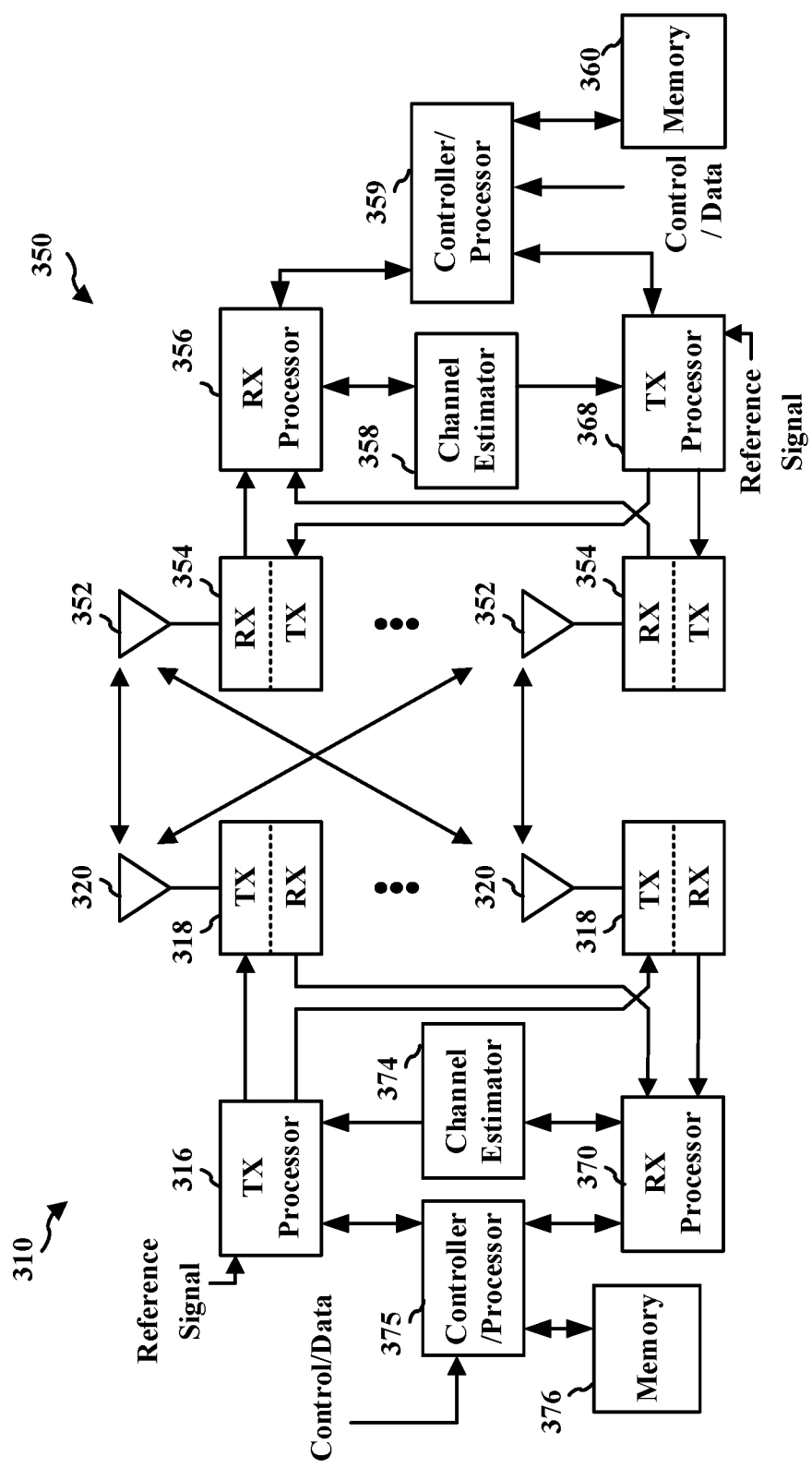
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 199 of FIG. 1.

At least one of the TX processor 316, the RX processor 370, and the controller/processor 375 may be configured to perform aspects in connection with 198 of FIG. 1.

Communication between a UE and a base station may involve patterns of movement or similarities in movement of the UE that may enable predetermined state changes to be determined for the UE. As one example, in industrial IoT (IIot), a communication device may move in a linear or circular path in a factory. The communication device may move with periodic motion relative to a location of a base station. As another example, a UE located on a train may move along the rails in a predetermined pattern. For example, a high speed train may move along the rails at a relatively constant speed, and base stations or remote radio heads (RRHs) may be positioned along the rails at certain intervals. The intervals may be uniform or non-uniform. Thus, the position of the UE relative to the base station(s)/ RRH(s) may be predetermined, e.g., the state changes of the UE may be predetermined. The predetermined pattern of state changes can be acquired by training based on past states of the UE and/or similar UEs. The predetermined pattern of state changes may be indicated by a network.

Predetermined configuration(s)/parameter(s) may be applied to the UE based on the predetermined state changes for the UE. Such predetermined configurations/parameters may help to reduce the overhead that would be required for the UE or base station to perform acquisition and adaption of configuration(s)/parameter(s), which comprises link measurements, sending/receiving reports, and signaling control messages. Instead, the UE may be configured with a predetermined sequence of configurations/parameters based on the predetermined state changes that are anticipated for the UE. For example, the predetermined configurations/parameters may include any of a predetermined beam switch over time as the UE moves, a predetermined beam switch based on a UE state, and/or a predetermined set of TCI states.

As presented in more detail herein, a base station may configure a UE with a sequence of predetermined configuration parameters for DRX operation based on predetermined state changes for the UE. A UE may be configured by a base station for DRX. During an RRC connected state, when there is no data transmission in either direction (UL/ DL), the UE may go into the DRX mode in which the UE starts monitoring the PDCCH channel discontinuously, using a sleep and wake cycle. As the UE is in an RRC connected mode, such DRX may also be known as Connected Mode DRX (CDRX). DRX/CDRX conserves battery power at the UE. Without DRX, the UE needs to monitor PDCCH in every subframe or slot to check whether there is downlink data available. Continuous monitoring of the PDCCH drains the UE's battery power.

The DRX configuration may be configured by the network in RRC signaling from a base station, e.g. in an RRC Connection Setup request or an RRC connection reconfiguration request. A DRX configuration may include the configuration of any of a number of timers and values, e.g., any of an ON duration Timer, a DRX Inactivity Timer, a DRX Retransmission Timer, a DRX UL Retransmission Timer, a long DRX Cycle, a value of the DRX Start Offset, a DRX Short Cycle Timer, and/or a short DRX Cycle, etc. A DRX Cycle may comprise a periodic repetition of ON Duration in which the UE monitors PDCCH and an OFF Duration, which may be referred to as a DRX opportunity. During the OFF duration, the UE does not monitor for PDCCH. The UE may enter a sleep mode or low power mode in which the UE minimizes power consumption by shutting down a radio frequency (RF) function without detecting communication from the base station.

Figure 4:
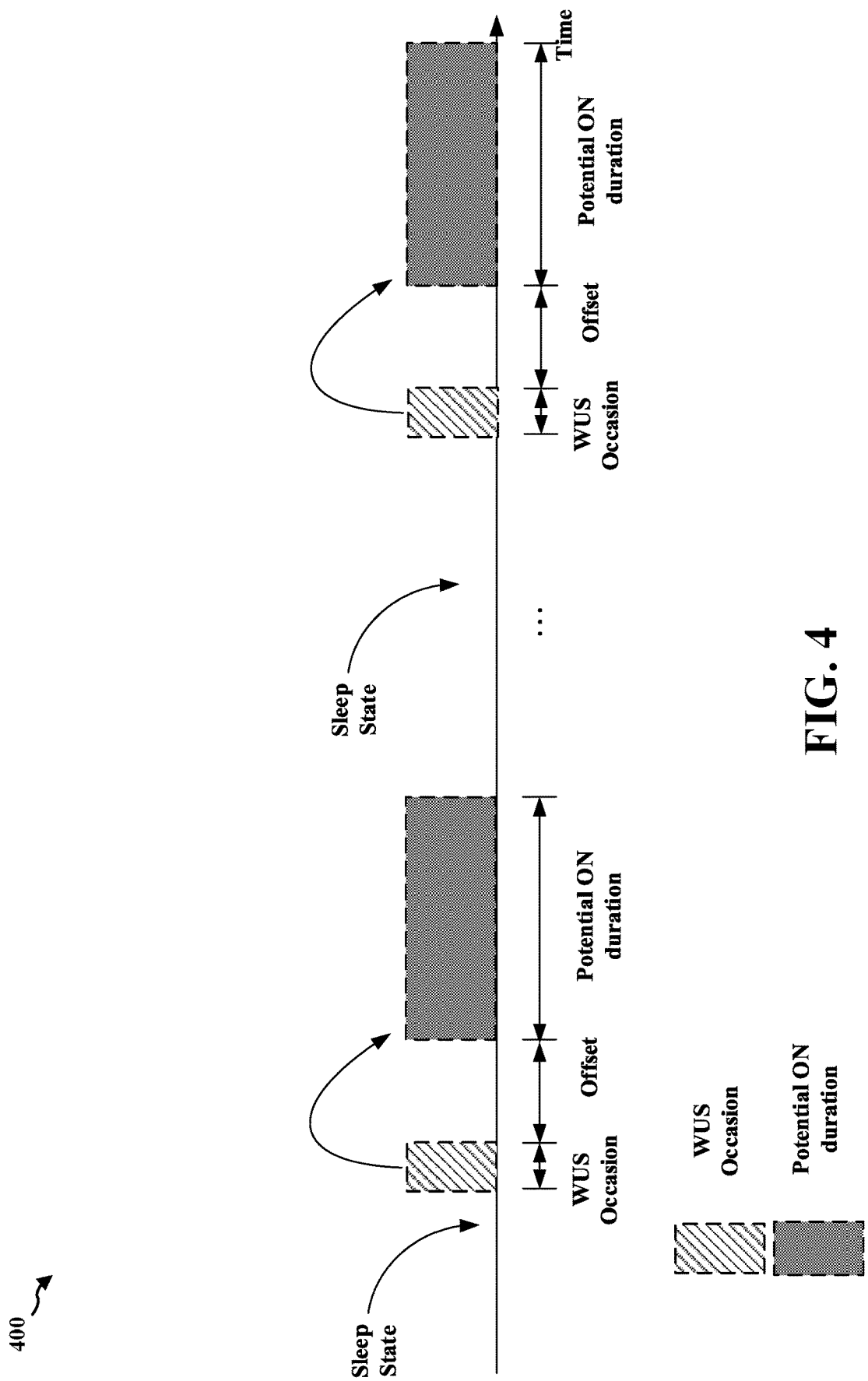
FIG. 4 illustrates an example of DRX operation.

DRX may provide a power saving mechanism for the UE and may be beneficial when data traffic is sparse or inactive. A wakeup signal (WUS) may be used in association with a DRX ON duration to indicate to the UE whether the base station has communication for transmission to the UE during the DRX ON duration. If a UE is configured to monitor for a WUS, in a DRX cycle where no PDCCH communication will be sent to the UE, the UE would monitor for the WUS signal without detecting the WUS because no WUS is sent when the base station will not send PDCCH in the DRX cycle. Thus, if the UE does not detect a WUS, the UE may return to the sleep mode or low power mode, e.g., without monitoring for PDCCH during the DRX ON duration. If the UE is not configured to monitor for the WUS, the UE would monitor the PDCCH search space(s) during the DRX ON duration and would expend more power. A PDCCH based WUS may be transmitted prior to the DRX ON duration, e.g., as illustrated in FIG. 4. The WUS may also have a different placement. For example, the WUS may be located at the beginning of an ON duration. FIG. 4 illustrates a diagram 400 of a DRX operation comprising a WUS. FIG. 4 illustrates two DRX cycles comprising a sleep state and a potential ON duration during which the UE may monitor for communication from a base station. The WUS occasion, during which the UE monitors for a WUS to determine whether to return to the sleep state or to monitor for PDCCH during the potential ON duration, is illustrated as being spaced before the ON duration by an offset. The UE monitors for PDCCH during the ON duration only when the corresponding WUS is detected, or when a detected WUS indicates for the UE to monitor for PDCCH. Otherwise, the UE may skip the ON duration and remain in a sleep mode to save power.

As presented herein, predetermined state changes for a UE may be used to configure the UE for predetermined DRX configurations and/or WUS monitoring. Such UEs, for which predetermined state changes can be identified or predicted, may experience further power savings by applying the predetermined DRX/WUS configurations as the UE's state changes without acquiring or receiving a new configuration for each state change. Thus, the UE may remain in a power saving mode (e.g., a sleep mode) during the course of the predetermined state changes and may apply the new configuration/parameters to the subsequent WUS occasion and/or ON duration. The predetermined DRX/ WUS configurations may be referred to as a sequence of predetermined configuration parameters. A sequence of predetermined DRX parameters may be configured, e.g., for UEs with sparse traffic in predetermined state changing scenarios whether or not the UE is configured to use a WUS. If a UE is not configured for a WUS, the UE may wake up from the sleep mode to monitor for PDCCH during a DRX ON duration.

The base station might not send a fine sequence of pre-determined configuration parameters for high-throughput DL/UL data transmission. Instead, the base station may send a minimum (or reduced) set of predetermined parameters for the UE to apply when monitoring for WUS or when performing a DRX operation. The base station may send refined information (e.g., configuration/parameters) when there is communication for the UE whether downlink or uplink. For example, when the base station has downlink data to send to the UE, the base station will send the UE a WUS (e.g., for a WUS configured UE) or scheduling PDCCH during DRX ON duration (e.g., for a WUS non-configured UE). The UE may send information to the base station that causes the base station to respond with refinement information. For example, the UE may send a scheduling request (SR). In some cases, the UE may request the base station to send refinement information. The UE may send an SR when the UE has data to send. The UE may then apply the refinement information when transmitting the uplink data.

Figure 5:
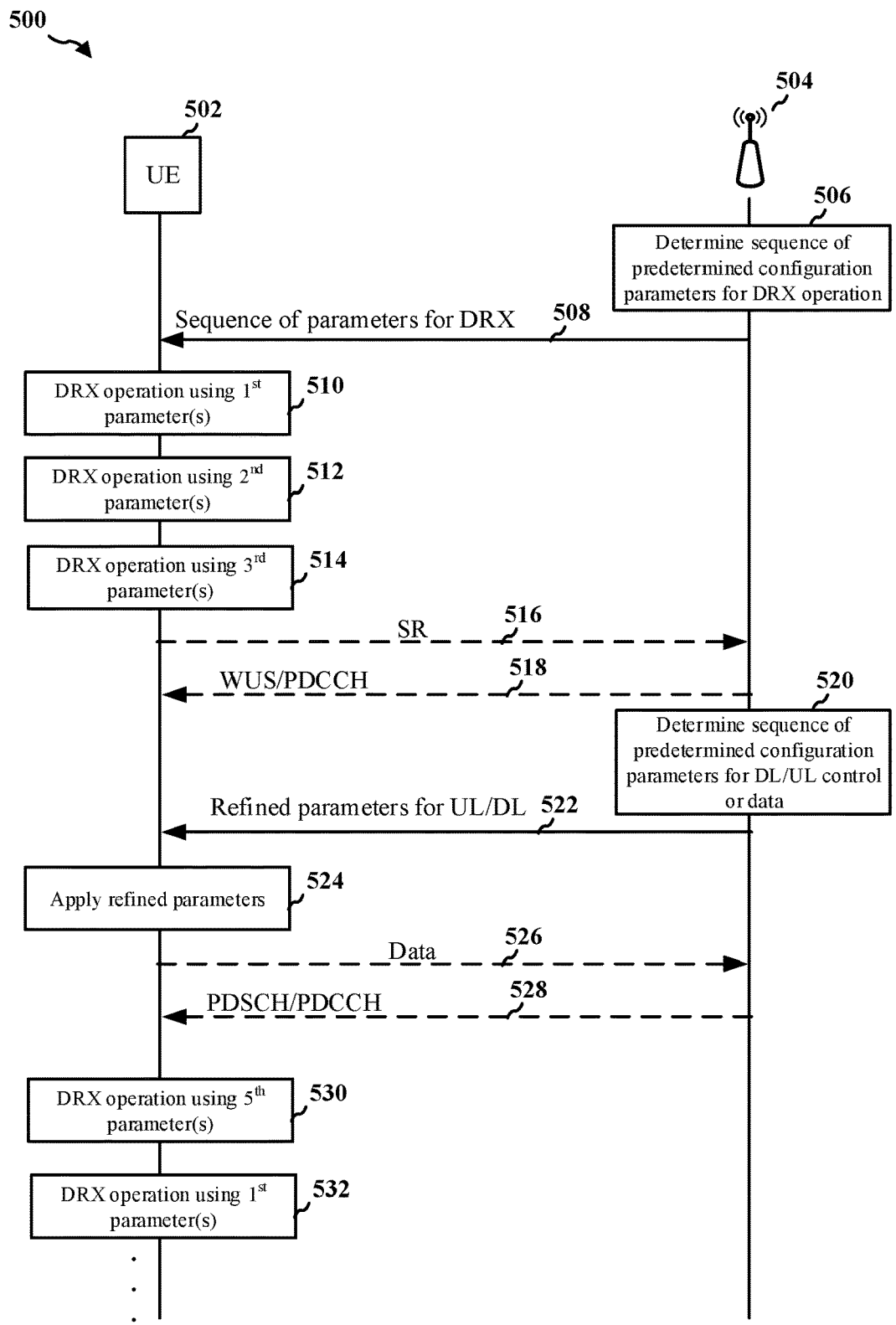
FIG. 5 illustrates an example communication flow between a base station and a UE.

FIG. 5 illustrates an example communication flow 500 between a UE 502 and a base station 504. At 508, the base station 504 indicates to the UE 502 a sequence of predetermined configuration parameters for WUS monitoring and/or DRX operation. The configuration parameters may be sparse and may correspond to a long duration, e.g., to multiple DRX cycles. Prior to indicating the sequence of predetermined configuration parameters, the base station may determine or generate the sequence of configuration parameters for the UE, at 506. The determination of the sequence may include identifying or otherwise determining state changes that the UE will, or is likely to, experience.

The sequence of configuration parameters may include a sequence of beams for the UE to switch to use during a WUS occasion and/or DRX ON duration of each of the multiple DRX cycles. Thus, the UE may use different beam(s) to monitor for WUS/PDCCH for different DRX cycles. This may enable the UE to adjust beams, e.g., to compensate for state changes that may occur while the UE is in a sleep state.

The sequence of configuration parameters may include lengths/intervals between adjacent WUS occasions and/or DRX cycles. Each DRX cycle, or a subset of DRX cycles, may be uniform in length and spacing in time. As another example, the DRX cycles, or a subset of DRX cycles in the sequence of configuration parameters may have non-uniform lengths in time. For example, if the UE is located on a train or along an assembly line, a non-uniform length/spacing for DRX cycles may be used when the train or assembly line is not moving at a constant speed. As another example, if the UE is located on a train or along an assembly line, a non-uniform length/spacing for DRX cycles may be used when there is a different distance between base stations or RRHs along the path of the train/assembly line. If the UE will be moving at a consistent speed and the base stations/RRHs are located at a uniform distance along the path of the UE, the DRX cycles configured for the UE may share a same length/spacing. Thus, the UE may apply a sequence of different DRX or WUS lengths/spacing in a predetermined manner. This may enable the UE to adjust for different speeds of the UE and/or different distances between base stations, e.g., to compensate for state changes that may occur while the UE is in a sleep state.

As another example, the sequence of configuration parameters may include an expected signal strength during a WUS occasion and/or ON duration of each of the multiple DRX cycles. Thus, the UE may apply a sequence of different signal strength parameters in a predetermined manner. This may enable the UE to adjust for different signal strengths in association with different state changes that may occur while the UE is in a sleep state of a DRX cycle. As an example, the sequence of configuration parameters may include parameters that relate to the automatic gain control (AGC) setup for the UE. Thus, the UE may apply a sequence of different AGC parameters in a predetermined manner. This may enable the UE to adjust the AGC for state changes that may occur while the UE is in a sleep state of a DRX cycle. During power saving operation, the UE 502 applies the indicated sequence of parameters, e.g., for monitoring during a WUS occasion or ON duration of each DRX cycle.

As illustrated at 510, 512, 514, the UE may apply the sequence of configuration parameters. At 510, the UE may apply first configuration parameter(s), such as using a beam, a length of DRX cycle, an interval between DRX cycles, signal strength parameters, AGC parameters, etc. for at least one DRX cycle. At 512, the UE may apply second configuration parameter(s) for at least one subsequent DRX cycle, as indicated by the base station in the sequence of configuration parameters. Between 512 and 514, the state of the UE may change. For example, the location of the UE relative to a base station may change. At 514, the UE may apply third configuration parameter(s) for at least one DRX cycle following the application of the second DRX parameter(s). The state of the UE may change between 512 and 514, e.g., the location of the UE may change relative to the base station. A sequence of three configuration parameters, as illustrated for 510, 512, 514, is merely an example. The sequence of configuration parameters indicated by the base station may include a sequence of only two configuration parameters for two predetermined states for the UE, and the sequence of configuration parameters may include a sequence of more than three configuration parameter(s) for the UE. Thus, the UE is able to apply appropriate DRX parameters as the UE changes states using the signaling 808 between the base station and UE and without requiring a new configuration each time the UE changes states.

When there is data or control to be transmitted to the UE or received by the UE, the base station may provide the UE with a refined sequence of parameters 522 for the uplink/downlink transmission. The refined sequence of parameters may be triggered by a scheduling request (SR) 516 from the UE indicating that the UE has uplink data for transmission to the base station and/or in association with a WUS and/or PDCCH 518 transmitted to the UE indicating that the base station has control or data to transmit to the UE. The SR 516 WUS and/or PDCCH 518 would be communicated according to the current DRX configuration parameters for the DRX cycle from the sequence of configuration parameters indicated by the base station at 508. As illustrated at 520, the base station may determine the sequence of configuration parameters for uplink/downlink transmissions. The base station may identify a current state of the UE within a sequence of predetermined state changes and may determine the refined configuration parameters based on the current state of the UE and the anticipated state changes of the UE during the time of the uplink/downlink transmission(s). Although the base station is described as providing a sequence of refined configuration parameters, the base station may also provide a single refined configuration parameter or a single set of refined configuration parameters, e.g., if the UE will not change states during the time of the uplink/downlink transmission(s). The refined sequence of configuration parameters 522 for the uplink/downlink transmission may be indicated for a shorter length of time than the sequence of configuration parameters for DRX indicated at 508. The refined sequence of configuration parameters 522 for the uplink/downlink transmission may be finer or denser than the sequence of configuration parameters for DRX indicated at 508. For example, the sequence of configuration parameters 522 may have additional parameters and/or different parameters than the sequence of configuration parameters for DRX indicated at 508. For example, in addition to or alternately to a beam, a length of DRX cycle, an interval between DRX cycles, signal strength parameters, AGC parameters, etc., the refined sequence of configuration parameters 522 may indicate a sequence of channel state information (CSI), a modulation and coding scheme (MCS), a number of multiple input multiple output (MIMO) layers, etc. Thus, the sequence of configuration parameters for DRX operation indicated at 508 may be sparser and for a longer length of time, whereas the sequence of configuration parameters for uplink/downlink transmission indicated at 522 may be finer and for a shorter length of time. The UE applies the refined sequence of configuration parameters, at 524. For example, the UE may use the refined sequence of configuration parameters to transmit control or data to the base station at 526 and/or to receive control or data from the base station at 528. Although 526 and 528 are illustrated with a single line, the communication of the uplink/downlink control or data may involve multiple transmissions exchanged between the base station and the UE. For example, a first transmission may be transmitted/received according to first configuration parameter(s) from the sequence of refined configuration parameters 522, a second transmission may be transmitted/received according to second configuration parameter(s) from the sequence of refined configuration parameters 522, and so forth according to the indicated sequence. The sequence of refined configuration parameters 522 may indicate a duration. At the end of the duration, the UE may return to applying the sequence of configuration parameters for DRX operation indicated at 508. For example, at 530, the UE may apply fourth configuration parameters from the sequence of configuration parameters to monitor for a WUS during a WUS occasion and/or for PDCCH during a DRX ON duration. Although 530 is described as involving fourth configuration parameters, some configuration parameters from the sequence of configuration parameters for DRX operation indicated at 508 may have been applicable to the time duration during which the UE applied the refined configuration parameters. Thus, the UE may skip at least one parameter from the sequence of configuration parameters for DRX operation indicated at 508. For example, the fourth configuration parameters indicated at 530 may be a fifth configuration parameter in the sequence of configuration parameters for DRX operation, and the UE may skip a fourth configuration parameter in the sequence that would have been applied during the time that the UE applied the refined sequence of configuration parameters 522.

The sequence of configuration parameters for DRX operation and/or the refined sequence of configuration parameters for uplink/downlink data transmission may be repeated periodically. For example, the predetermined state changes for a communication device involved in IIoT may involve a periodic movement of the communication device within a factory. The base station may provide the sequence of configuration parameters for DRX operation indicated at 508 with an indication for the UE to apply the sequence in a repeated or periodic manner, which will further reduce the signaling between the base station and the UE to configure the UE for DRX operation. This, FIG. 5 illustrates the UE repeating use of the first configuration parameter(s) at 532 that were first applied at 510. The UE may continue to apply the second configuration parameters that were applied at 512, the third configuration parameters that were applied at 514, and so forth. In another example, the sequence of configuration parameters may be applied for a duration indicated by the base station.

Figure 6:
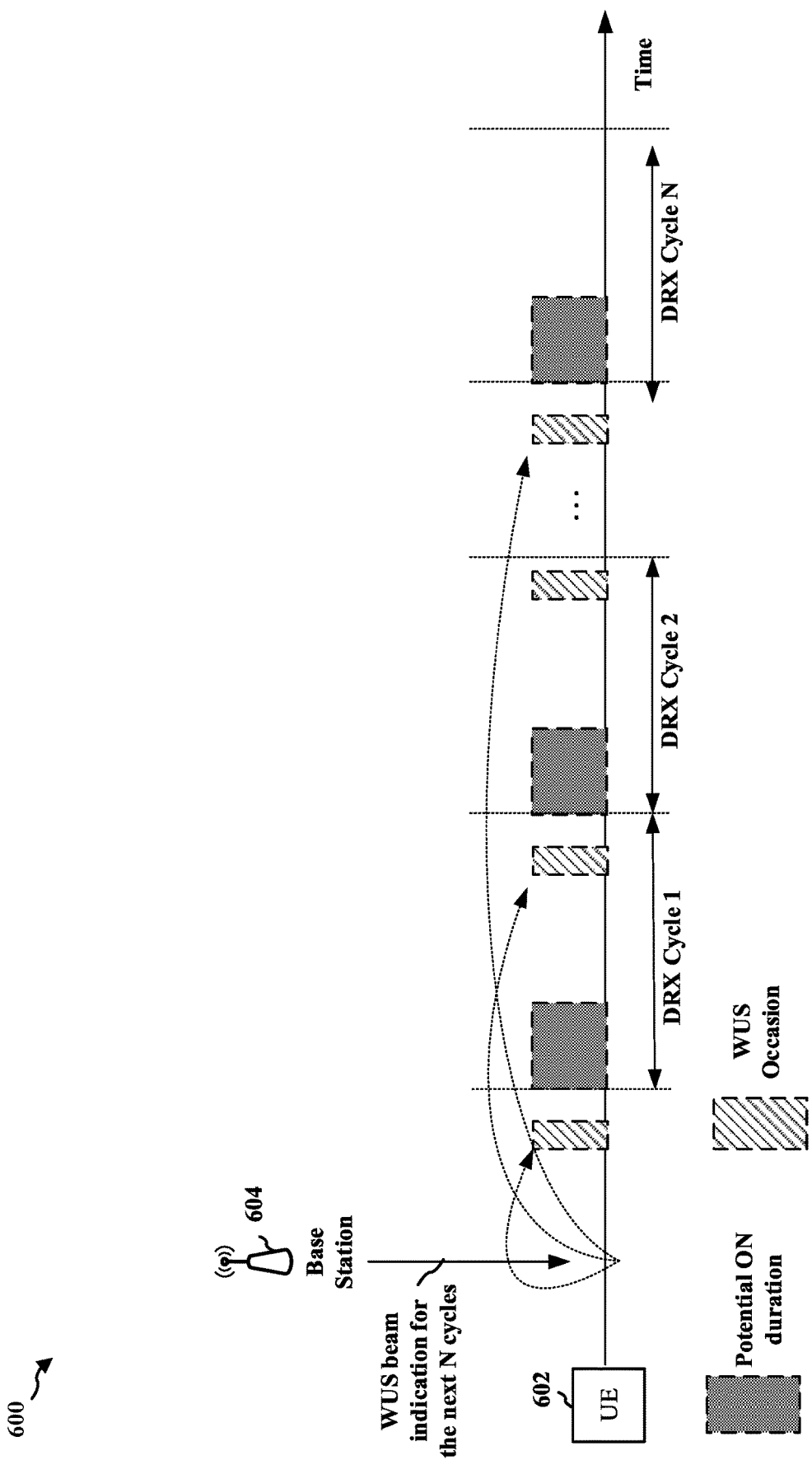
FIG. 6 illustrates an example of DRX operation including a sequence of predetermined configuration parameters for DRX operation.

FIG. 6 illustrates an example 600 of a sequence of configuration parameters for WUS monitoring being provided by a base station 604 to a UE 602. As an example, the base station 604 may indicate a sequence of N WUS beams (or other parameters for WUS monitoring or PDCCH monitoring) for N DRX cycles. The indication may be provided to the UE before the UE experiences the predetermined state changes, e.g., before the UE begins a predetermined motion or cycle in a factory, before a UE moves through locations on a train, etc. In the example 600 in FIG. 6, the UE may use a first beam indicated in the sequence to monitor for a WUS during a WUS occasion in DRX cycle 1, a second beam indicated in the sequence to monitor for a WUS during a WUS occasion in DRX cycle 2, and so forth to DRX cycle N. In other examples, the UE may apply the same beam for multiple DRX cycles as part of the indicated sequence. The base station may indicate for the UE to repeat the use of the sequence of beams in a periodic manner, e.g., if the UE moves in a periodic manner in a factory.

Figure 7:
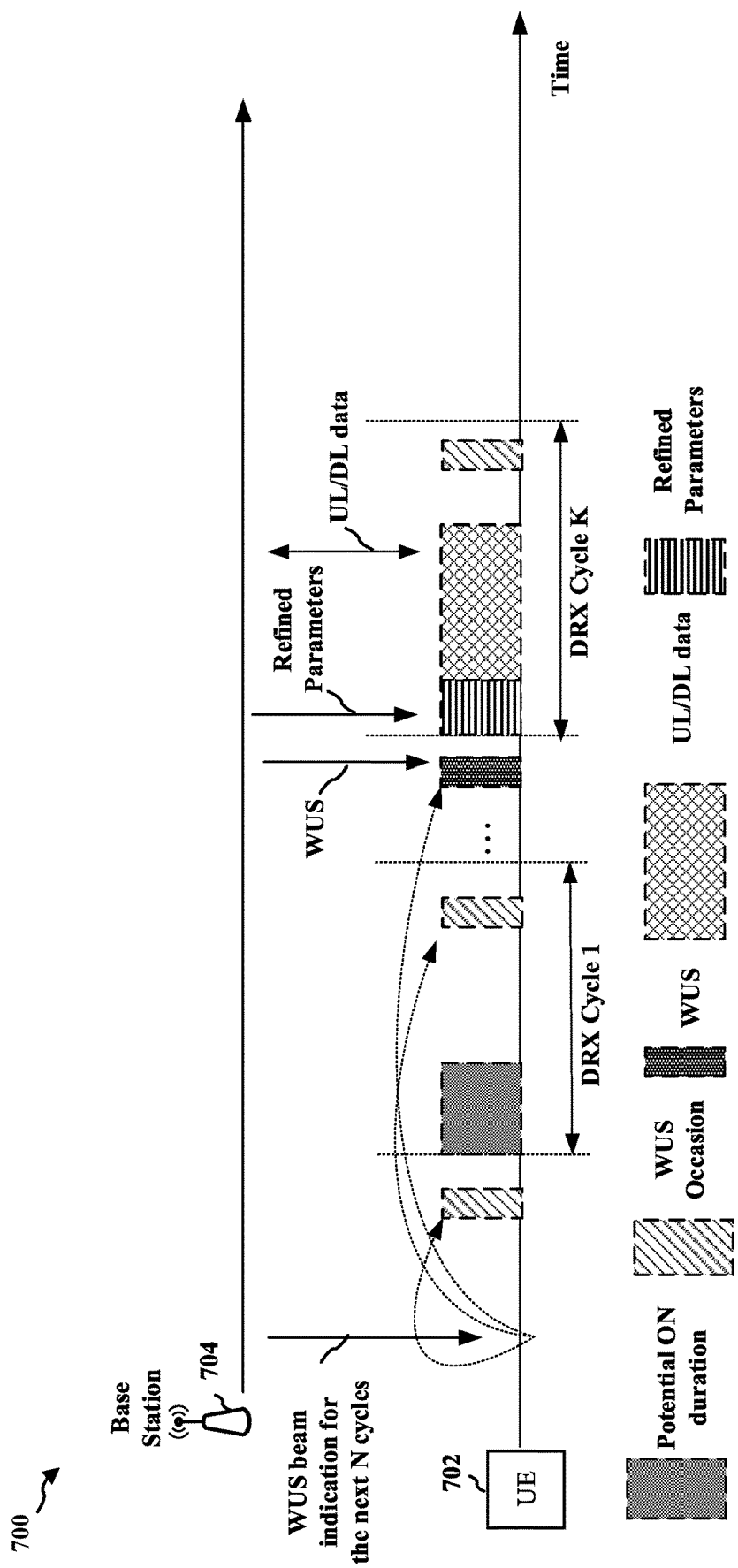
FIG. 7 illustrates an example of DRX operation including a sequence of predetermined configuration parameters for DRX operation and refinement parameters for data transmission.

FIG. 7 illustrates an example 700 in which a base station 704 sends refined configuration parameter(s) for uplink/downlink transmissions between the base station 704 and UE 702. Similar to the example in FIG. 6, the base station 704 initially indicate a sequence of configuration parameters for WUS monitoring or PDCCH monitoring for a duration of N DRX cycles. The UE may use the indicated sequence of configuration parameter to monitor for WUS/PDCCH during corresponding WUS occasions or DRX ON durations. If the base station has data to transmit to the UE, e.g., in DRX cycle K, the base station sends a WUS or PDCCH based on the predetermined configuration parameters for the corresponding DRX cycle, i.e., DRX cycle K. The WUS indicates to the UE to terminate the power saving mode in order to receive the data. The base station may provide the UE with an indication of refined parameters, e.g., different and/or additional parameters, to be used to receive the data transmission. Following the data transmission, the UE may return to DRX operation using the previously indicated sequence of configuration parameters until DRX cycle N. Similarly, a SR received from the UE may trigger the base station to send refined parameters for the UE to use to transmit the data to the base station.

Figure 8:
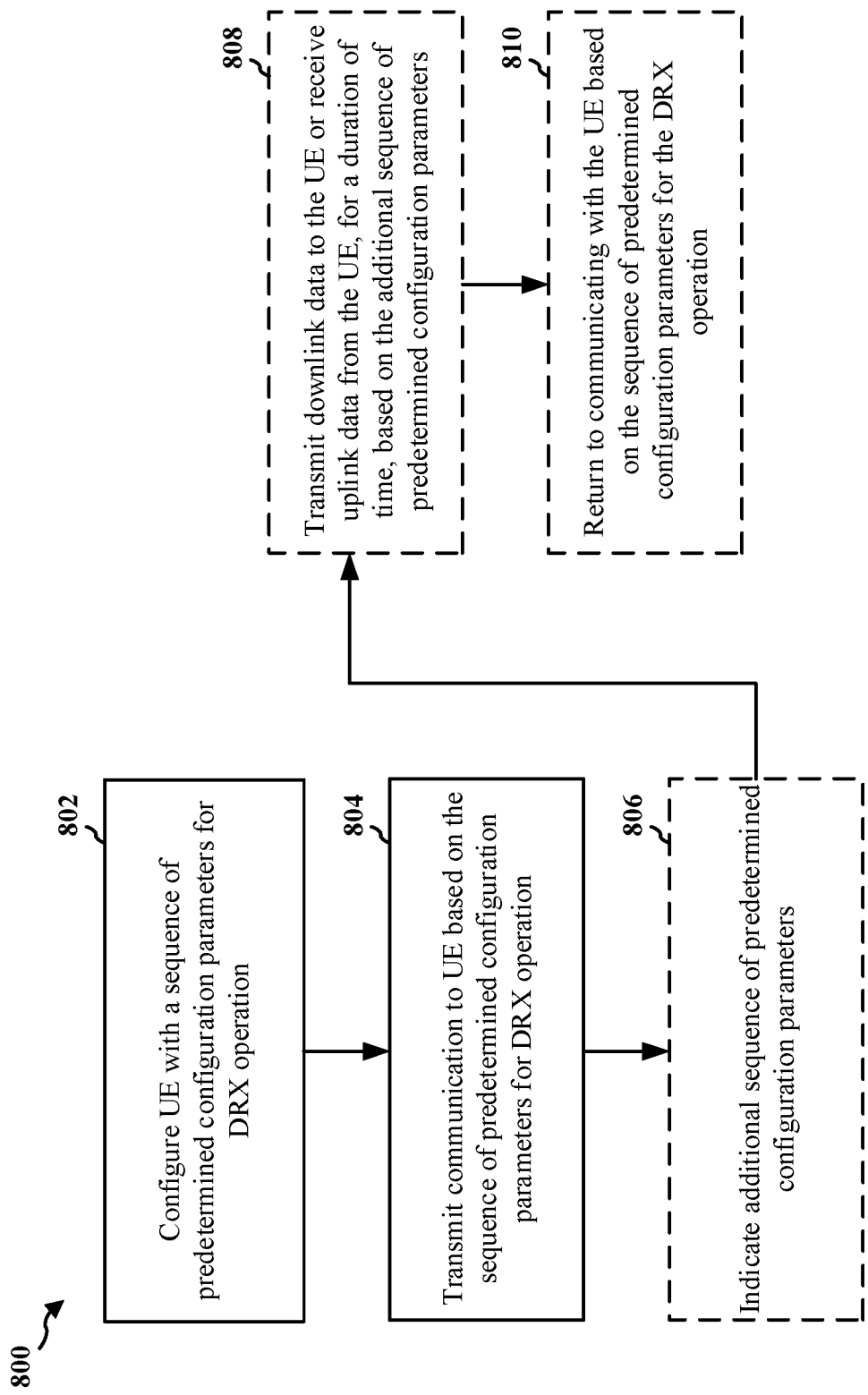
FIG. 8 is a flowchart of a method of wireless communication.

FIG. 8 is a flowchart 800 of a method of wireless communication. The method may be performed by a base station or a component of a base station (e.g., the base station 102, 180, 310, 704, 1250; the apparatus 902/902'; the processing system 1014, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The base station may implement the method of diagram 700. Optional aspects are illustrated with a dashed line. The method may enable a base station to reduce signaling between a UE and the base station by providing a sequence of predetermined configuration parameters to a UE having predetermined or predictable state changes. Such signaling may enable the UE to apply changes in DRX configuration based on state changes that may occur while the UE is in a sleep state between monitoring for WUS or PDCCH.

At 802, the base station may configure a UE with a sequence of predetermined configuration parameters for DRX operation. The DRX operation may include monitoring for WUS during a WUS occasion and/or monitoring for PDCCH during a DRX ON duration. For example, 802 may be performed by sequence component 906 of apparatus 902. The predetermined configuration parameters for DRX operation may be based on predetermined state changes for the UE. In some aspects, the DRX operation may comprise a plurality of DRX cycles. In some aspects, the sequence of predetermined configuration parameters may comprise a sequence of beams. For example, at least one beam in the sequence of beams may be indicated for the UE to use during a WUS occasion or a DRX ON duration of each DRX cycle comprised in the plurality of DRX cycles. In some aspects, the sequence of predetermined configuration parameters may comprise time intervals between adjacent WUS occasions or adjacent DRX ON durations comprised in the plurality of DRX cycles. In some instances, the time intervals may be non-uniform. However, in some instances, at least a subset of the time intervals may be uniform. The time intervals may be based on a distance between adjacent base stations or adjacent remote radio heads along a predetermined path for the UE. In some aspects, the sequence of predetermined configuration parameters may comprise signal strength information corresponding to a WUS occasion or DRX ON duration of each DRX cycle comprised in the plurality of DRX cycles. The signal strength information may comprise AGC parameters for the WUS occasion or the DRX ON duration of each DRX cycle comprised in the plurality of DRX cycles.

At 804, the base station may transmit communication to the UE based on the sequence of predetermined configuration parameters for the DRX operation. For example, 804 may be performed by communication component 908 of apparatus 902. In some aspects, the communication may include at least one of a WUS transmitted to the UE in association with a DRX ON duration, a control channel transmitted to the UE during the DRX ON duration, or a scheduling request received from the UE.

At 806, the base station may indicate an additional sequence of predetermined configuration parameters for downlink data reception by the UE or uplink data transmission from the UE. For example, 806 may be performed by additional sequence component 910 of apparatus 902. In some aspects, the sequence of predetermined configuration parameters for the DRX operation may correspond to a longer amount of time than the additional sequence of predetermined configuration parameters for the downlink data reception or the uplink data transmission. In some aspects, the additional sequence of predetermined configuration parameters for the downlink data reception by the UE or the uplink data transmission from the UE may comprise a denser sequence of predetermined configuration parameters than the sequence of predetermined configuration parameters for the DRX operation. For example, the denser sequence of predetermined configuration parameters may correspond to a finer, shorter term set of configuration parameters and may also be referred to as a "refined" sequence of parameters. In some aspects, the additional sequence of predetermined configuration parameters for the downlink data reception by the UE or the uplink data transmission from the UE may comprise a sequence of channel state information. The sequence of channel state information may comprise at least one of a sequence of modulation and coding schemes, a sequence of precoding schemes, or a sequence of the number of multiple input multiple output layers.

At 808, the base station may transmit downlink data to the UE or receive uplink data from the UE for a duration of time. For example, 808 may be performed by time duration component 912 of apparatus 902. In some aspects, the transmitting of downlink data to the UE or the receiving of uplink data form the UE for the duration of time may be based on the additional sequence of predetermined configuration parameters.

At 810, the base station may be configured to return to communicating with the UE based on the sequence of predetermined configuration parameters for the DRX operation following the duration of time. For example, 810 may be performed by return component 914 of apparatus 902. The base station being configured to return to communicating with the UE based on the sequence of predetermined configuration parameters allows the base station to reduce or minimize signaling overhead with the UE due to the predetermined or predictable state changes for the UE.

Figure 9:
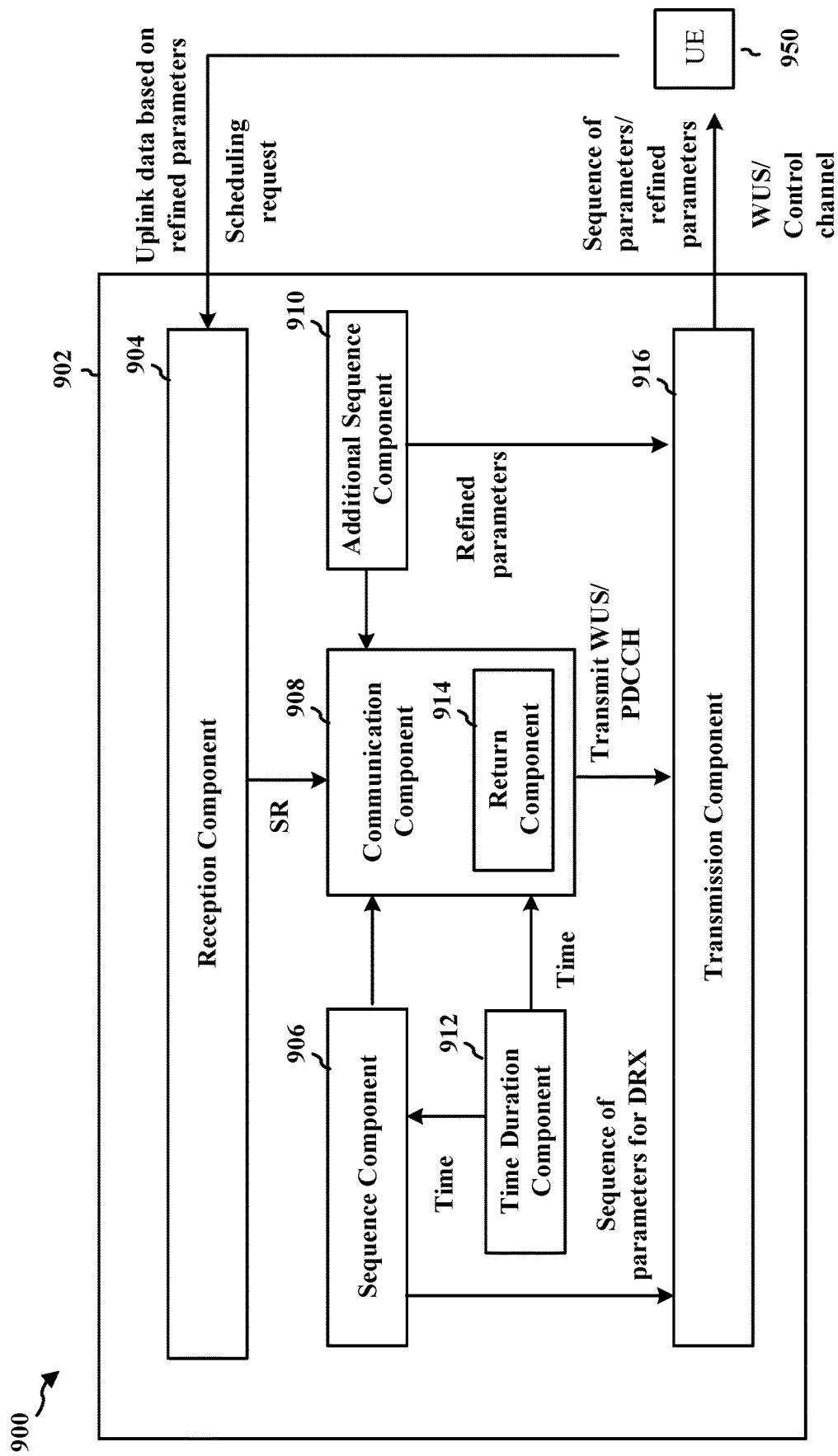
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus may be a base station or a component of a base station. The apparatus may perform the method of flowchart 800. The apparatus includes a reception component 904 that may be configured to receive various types of signals/messages and/or other information from other devices, including, for example, the UE 950. The apparatus includes a sequence component 906 that may configure a UE with a sequence of predetermined configuration parameters for DRX operation based on predetermined state changes for the UE, e.g., as described in connection with 802 of FIG. 8. The apparatus includes a communication component 908 that may transmit communication to the UE based on the sequence of predetermined configuration parameters for the DRX operation, e.g., as described in connection with 804 of FIG. 8. The apparatus includes an additional sequence component 910 that may indicate an additional sequence of predetermined configuration parameters for downlink data reception by the UE or uplink data transmission from the UE, e.g., as described in connection with 806 of FIG. 8. The apparatus includes a time duration component 912 that may be configured to transmit downlink data to the UE or receive uplink data from the UE, for a duration of time, based on the additional sequence of predetermined configuration parameters, e.g., as described in connection with 808 of FIG. 8. The apparatus includes a return component 914 that may be configured to return to communicating with the UE based on the sequence of predetermined configuration parameters for the DRX operation following the duration of time, e.g., as described in connection with 810 of FIG. 8. The apparatus includes a transmission component 916 that may be configured to transmit various types of downlink signals/messages to the UE 950.

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
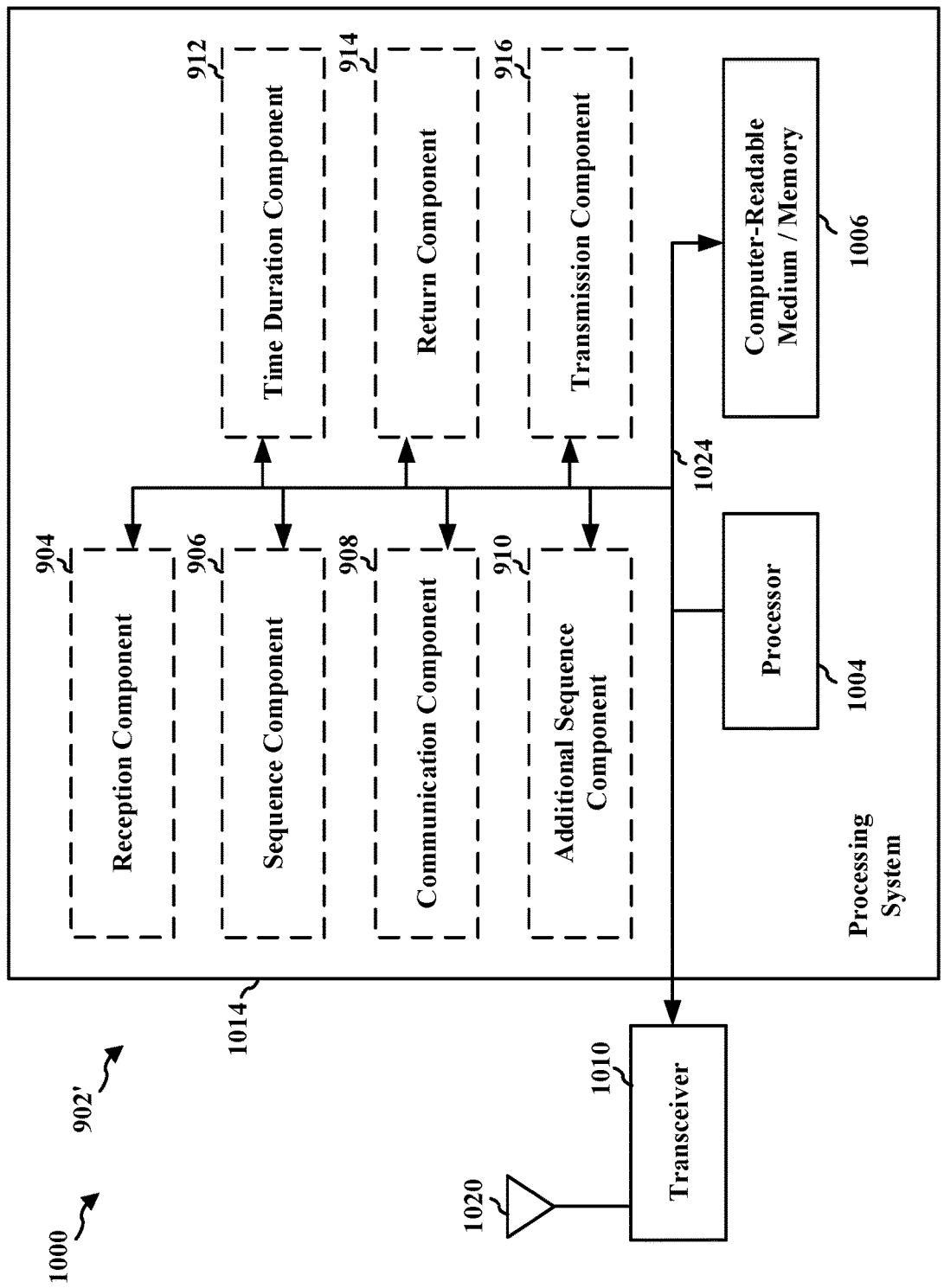
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914, 916 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 916, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912, 914, 916. The components may be software components running in the processor 1004, resident/stored in the computer readable medium/memory 1006, one or more hardware components coupled to the processor 1004, or some combination thereof. The processing system 1014 may be a component of the base station 310 and may include the memory 376 and/or at least one of the TX processor 316, the RX processor 370, and the controller/processor 375. Alternatively, the processing system 1014 may be the entire base station (e.g., see 310 of FIG. 3).

In one configuration, the apparatus 902/902' for wireless communication includes means for configuring a UE with a sequence of predetermined configuration parameters for DRX operation based on predetermined state changes for the UE. The DRX operation may comprise a plurality of DRX cycles. The apparatus includes means for transmitting communication to the UE based on the sequence of predetermined configuration parameters for the DRX operation. The apparatus may further include means for indicating an additional sequence of predetermined configuration parameters for downlink data reception by the UE or uplink data transmission from the UE. The apparatus may further include means for transmitting downlink data to the UE or receiving uplink data from the UE, for a duration of time, based on the additional sequence of predetermined configuration parameters. The apparatus may further include means for returning to communicating with the UE based on the sequence of predetermined configuration parameters for the DRX operation following the duration of time. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 11:
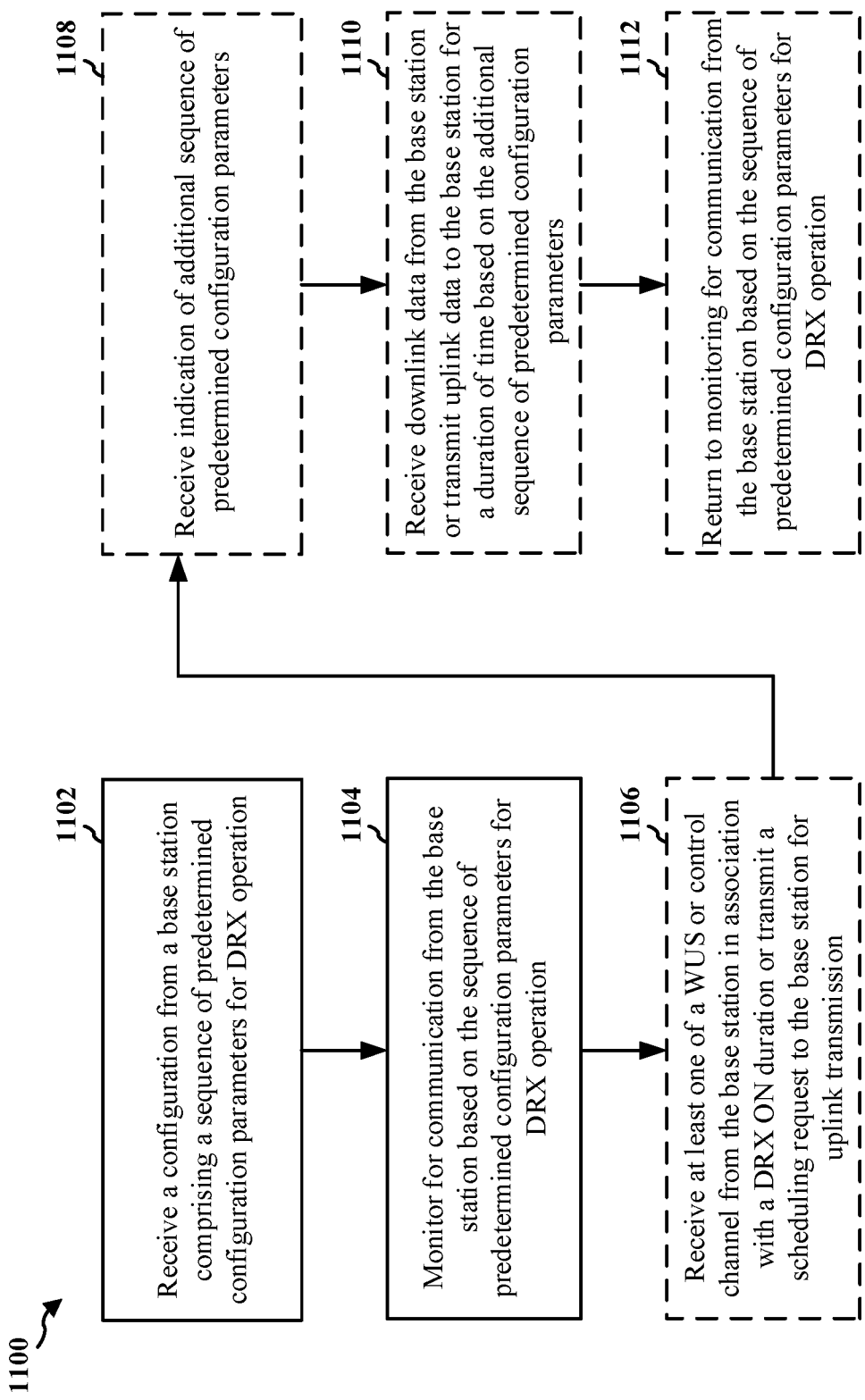
FIG. 11 is a flowchart of a method of wireless communication.

FIG. 11 is a flowchart 1100 of a method of wireless communication. The method may be performed by a UE or a component of a UE (e.g., the UE 104, 350, 702, 950; the apparatus 1202/1202'; the processing system 1314, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The UE may implement the method of diagram 700. Optional aspects are illustrated with a dashed line. The method may allow a UE to remain in a power saving mode in the course of predetermined or predictable state changes, thereby reducing power consumption. The method may enable the UE to apply DRX configuration changes for state changes that may occur while the UE is in a sleep state.

At 1102, the UE may receive a configuration from a base station comprising a sequence of predetermined configuration parameters for DRX operation. For example, 1102 may be performed by sequence component 1206 of apparatus 1202. In some aspects, the sequence of predetermined configuration parameters for DRX operation may be based on predetermined state changes for the UE. In some aspects, the DRX operation may comprise a plurality of DRX cycles. In some aspects, the sequence of predetermined configuration parameters may comprise a sequence of beams. For example, at least one beam in the sequence of beams may be indicated for the UE to use during a WUS occasion or a DRX on duration of each DRX cycle comprised in the plurality of DRX cycles. In some aspects, the sequence of predetermined configuration parameters may comprise time intervals between adjacent WUS occasions or adjacent DRX ON durations comprised in the plurality of DRX cycles. In some aspects, the time intervals may be non-uniform, while in some aspects, at least a subset of the time intervals may be uniform. In some aspects, the time intervals may be based on a distance between adjacent base stations or adjacent remote radio heads along a predetermined path for the UE. In some aspects, the sequence of predetermined configuration parameters may comprise signal strength information corresponding to a WUS occasion or DRX ON duration of each DRX cycle comprised in the plurality of DRX cycles. The signal strength information may comprise AGC parameters for the WUS occasion or the DRX ON duration of each DRX cycle comprised in the plurality of DRX cycles. In some aspects, the UE may apply the sequence of predetermined configuration parameters for the DRX operation during a WUS occasion or a DRX ON duration of each DRX cycle. In some aspects, the UE may apply the sequence of predetermined configuration parameters for the DRX operation in a repeated manner. In some aspects, the UE may apply the sequence of predetermined configuration parameters for the DRX operation for an indicated duration of time.

At 1104, the UE may be configured to monitor communication from the base station. For example, 1104 may be performed by monitor component 1208 of apparatus 1202. In some aspects, the monitoring of communications from the base station may be based on the sequence of predetermined configuration parameters for the DRX operation.

At 1106, the UE may be configured to receive at least one of a WUS from the base station in association with a DRX ON duration or a control channel from the base station during the DRX ON duration or transmitting a scheduling request to the base station for uplink transmission. For example, 1106 may be performed by WUS component 1211 or SR component 1210 of apparatus 1202.

At 1108, the UE may be configured to receive an indication of an additional sequence of predetermined configuration parameters for downlink data reception or uplink data transmission. For example, 1108 may be performed by additional sequence component 1212 of apparatus 1202. In some aspects, the sequence of predetermined configuration parameters for the DRX operation may correspond to a longer amount of time than the additional sequence of predetermined configuration parameters for the downlink data reception or the uplink data transmission. In some aspects, the additional sequence of predetermined configuration parameters for the downlink data reception by the UE or the uplink data transmission from the UE may comprise a denser sequence of predetermined configuration parameters than the sequence of predetermined configuration parameters for the DRX operation. For example, the denser sequence of predetermined configuration parameters may correspond to a finer, shorter term set of configuration parameters and may also be referred to as a "refined" sequence of parameters. In some aspects, the additional sequence of predetermined configuration parameters for the downlink data reception by the UE or the uplink data transmission from the UE may comprise a sequence of channel state information. The sequence of channel state information may comprise at least one of a sequence of modulation and coding schemes, a sequence of precoding schemes, or a sequence of the number of multiple input multiple output layers.

At 1110, the UE may be configured to receive downlink data from the base station or transmit uplink data to the base station for a duration of time. For example 1110 may be performed by time duration component 1214 of apparatus 1202. In some aspects, the receiving of downlink data from the base station or the transmitting of uplink data to the base station for the duration of time may be based on the additional sequence of predetermined configuration parameters.

At 1112, the UE may be configured to return to monitoring for communications form the base station. For example, 1112 may be performed by return component 1216 of apparatus 1202. In some aspects, the UE may return to monitoring for communications from the base station based on the sequence of predetermined configuration parameters for the DRX operation following the duration of time.

Figure 12:
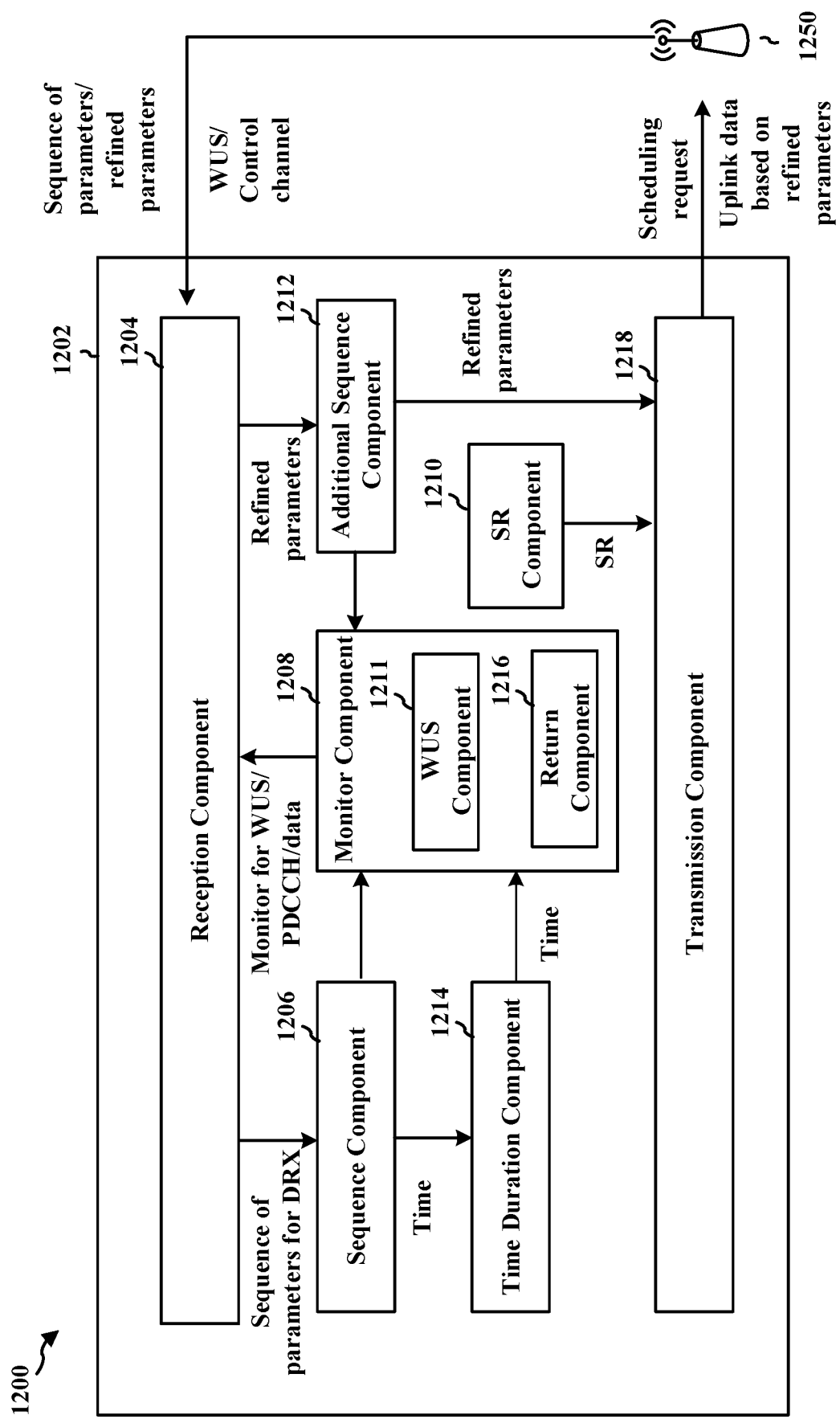
FIG. 12 is a conceptual data flow diagram illustrating the data flow between different means/components in an example apparatus.

FIG. 12 is a conceptual data flow diagram 1200 illustrating the data flow between different means/components in an example apparatus 1202. The apparatus may be a UE. The apparatus may perform the method of flowchart 1100. The apparatus includes a component reception 1204 that may be configured to receive various types of signals/messages and/or other information from other devices, including, for example, the base station 1250. The apparatus includes a sequence component 1206 that may be configured to receive a configuration from a base station comprising a sequence of predetermined configuration parameters for DRX operation based on predetermined state changes for the UE, e.g., as described in connection with 1102 of FIG. 11. The apparatus includes a monitor component 1208 that may monitor for communication from the base station based on the sequence of predetermined configuration parameters for the DRX operation, e.g., as described in connection with 1104 of FIG. 11. The apparatus includes a WUS component 1211 that may receive at least one of a WUS from the base station in association with a DRX ON duration or a control channel from the base station during the DRX ON duration and/or an SR component 1210 that may transmit a scheduling request to the base station for uplink transmission, e.g., as described in connection with 1106 of FIG. 11. The apparatus includes an additional sequence component 1212 that may receive an indication of additional sequence of predetermined configuration parameters for downlink data reception or uplink data transmission, e.g., as described in connection with 1108 of FIG. 11. The apparatus includes a time duration component 1214 that may receive downlink data from the base station or may transmit uplink data to the base station for a duration of time based on the additional sequence of predetermined configuration parameters, e.g., as described in connection with 1110 of FIG. 11. The apparatus includes a return component 1216 that may return to monitoring for communication from the base station based on the sequence of predetermined configuration parameters for the DRX operation following the duration of time, e.g., as described in connection with 1112 of FIG. 12. The apparatus includes a transmission component 1218 that may be configured to transmit various types of uplink signals/messages to the base station 1250.

The apparatus may include additional components that perform each of the blocks of the algorithm in the aforementioned flowcharts of FIG. 11. As such, each block in the aforementioned flowcharts of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

FIG. 13 is a diagram 1300 illustrating an example of a hardware implementation for an apparatus 1102' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1211, 1212, 1214, 1216, 1218 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1218, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1211, 1212, 1214, 1216, 1218. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359. Alternatively, the processing system 1314 may be the entire UE (e.g., see 350 of FIG. 3).

In one configuration, the apparatus 1202/1202' for wireless communication includes means for receiving a configuration from a base station comprising a sequence of predetermined configuration parameters for DRX operation based on predetermined state changes for the UE. The DRX operation may comprise a plurality of DRX cycles. The apparatus includes means for monitoring for communication from the base station based on the sequence of predetermined configuration parameters for the DRX operation. The apparatus further includes means for receiving at least one of a WUS from the base station in association with a DRX ON duration or a control channel from the base station during the DRX ON duration or transmitting a scheduling request to the base station for uplink transmission. The apparatus further includes means for receiving an indication of an additional sequence of predetermined configuration parameters for downlink data reception or uplink data transmission. The apparatus further includes means for receiving downlink data from the base station or transmitting uplink data to the base station for a duration of time based on the additional sequence of predetermined configuration parameters. The apparatus further includes means for returning to monitoring for communication from the base station based on the sequence of predetermined configuration parameters for the DRX operation following the duration of time. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples are illustrative only and may be combined with aspects of other embodiments or teaching described herein, without limitation.

Example 1 is a method of wireless communication at a UE comprising receiving a configuration from a base station comprising a sequence of predetermined configuration parameters for discontinuous reception (DRX) operation based on predetermined state changes for the UE, wherein the DRX operation comprises a plurality of DRX cycles; and monitoring for communication from the base station based on the sequence of predetermined configuration parameters for the DRX operation.

In Example 2, the method of Example 1 further includes that the sequence of predetermined configuration parameters comprises a sequence of beams, at least one beam in the sequence of beams being indicated for the UE to use during a WUS occasion or a DRX on duration of each DRX cycle comprised in the plurality of DRX cycles.

In Example 3, the method of Example 1 or 2 further includes that the sequence of predetermined configuration parameters comprises time intervals between adjacent WUS occasions or adjacent DRX ON durations comprised in the plurality of DRX cycles.

In Example 4, the method of any of Examples 1-3 further includes that the time intervals are non-uniform.

In Example 5, the method of any of Examples 1-4 further includes that at least a subset of the time intervals are uniform.

In Example 6, the method of any of Examples 1-5 further includes that the time intervals are based on a distance between adjacent base stations or adjacent remote radio heads along a predetermined path for the UE.

In Example 7, the method of any of Examples 1-6 further includes that the sequence of predetermined configuration parameters comprises signal strength information corresponding to a wake up signal (WUS) occasion or DRX ON duration of each DRX cycle comprised in the plurality of DRX cycles.

In Example 8, the method of any of Examples 1-7 further includes that the signal strength information comprises automatic gain control (AGC) parameters for the WUS occasion or the DRX ON duration of each DRX cycle comprised in the plurality of DRX cycles.

In Example 9, the method of any of Examples 1-8 further includes receiving at least one of a wake up signal (WUS) from the base station in association with a DRX ON duration or a control channel from the base station during the DRX ON duration or transmitting a scheduling request to the base station for uplink transmission; and receiving an indication of an additional sequence of predetermined configuration parameters for downlink data reception or uplink data transmission.

In Example 10, the method of any of Examples 1-9 further includes that the sequence of predetermined configuration parameters for the DRX operation corresponds to a longer amount of time than the additional sequence of predetermined configuration parameters for the downlink data reception or the uplink data transmission.

In Example 11, the method of any of Examples 1-10 further includes that the additional sequence of predetermined configuration parameters for the downlink data reception by the UE or the uplink data transmission from the UE comprises a denser sequence of predetermined configuration parameters than the sequence of predetermined configuration parameters for the DRX operation.

In Example 12, the method of any of Examples 1-11 further includes that the additional sequence of predetermined configuration parameters for the downlink data reception by the UE or the uplink data transmission from the UE comprises a sequence of channel state information.

In Example 13, the method of any of Examples 1-12 further includes that the sequence of channel state information comprises at least one of a sequence of modulation and coding schemes, a sequence of precoding schemes, or a sequence of the number of multiple input multiple output layers.

In Example 14, the method of any of Examples 1-13 further includes receiving downlink data from the base station or transmitting uplink data to the base station for a duration of time based on the additional sequence of predetermined configuration parameters; and returning to monitoring for communication from the base station based on the sequence of predetermined configuration parameters for the DRX operation following the duration of time.

In Example 15, the method of any of Examples 1-14 further includes that the UE applies the sequence of predetermined configuration parameters for the DRX operation during a wake up signal (WUS) occasion or a DRX ON duration of each DRX cycle.

In Example 16, the method of any of claims 1-15 further includes that the UE applies the sequence of predetermined configuration parameters for the DRX operation in a repeated manner.

Example 17 is a device including one or more processors and one or more memories in electronic communication with the one or more processors storing instructions executable by the one or more processors to cause the system or apparatus to implement a method as in any of Examples 1-16.

Example 18 is a system or apparatus including means for implementing a method or realizing an apparatus as in any of Examples 1-16.

Example 19 is a non-transitory computer readable medium storing instructions executable by one or more processors to cause the one or more processors to implement a method as in any of Examples 1-16.

Example 20 is a method of wireless communication at a base station, comprising: configuring a user equipment (UE) with a sequence of predetermined configuration parameters for discontinuous reception (DRX) operation based on predetermined state changes for the UE, wherein the DRX operation comprises a plurality of DRX cycles; and transmitting communication to the UE based on the sequence of predetermined configuration parameters for the DRX operation.

In Example 21, the method of Example 20 further includes that the sequence of predetermined configuration parameters comprises a sequence of beams, wherein at least one beam in the sequence of beams is indicated for the UE to use during a WUS occasion or a DRX ON duration of each DRX cycle comprised in the plurality of DRX cycles.

In Example 22, the method of Examples 20 or 21 further includes that the sequence of predetermined configuration parameters comprises time intervals between adjacent WUS occasions or adjacent DRX ON durations comprised in the plurality of DRX cycles.

In Example 23, the method of any of Examples 20-22 further includes that the time intervals are non-uniform.

In Example 24, the method of any of Examples 20-23 further includes that at least a subset of the time intervals are uniform.

In Example 25, the method of any of Examples 20-24 further includes that the time intervals are based on a distance between adjacent base stations or adjacent remote radio heads along a predetermined path for the UE.

In Example 26, the method of any of Examples 20-25 further includes that the sequence of predetermined configuration parameters comprises signal strength information corresponding to a wake up signal (WUS) occasion or DRX ON duration of each DRX cycle comprised in the plurality of DRX cycles.

In Example 27, the method of any of Examples 20-26 further includes that the signal strength information comprises automatic gain control (AGC) parameters for the WUS occasion or the DRX ON duration of each DRX cycle comprised in the plurality of DRX cycles.

In Example 28, the method of any of Examples 20-27 further includes that the communication comprises at least one of a wake up signal (WUS) transmitted to the UE in association with a DRX ON duration, a control channel transmitted to the UE during the DRX ON duration, or a scheduling request received from the UE, the method further comprising: indicating an additional sequence of predetermined configuration parameters for downlink data reception by the UE or uplink data transmission from the UE.

In Example 29, the method of any of Examples 20-28 further includes that the sequence of predetermined configuration parameters for the DRX operation corresponds to a longer amount of time than the additional sequence of predetermined configuration parameters for the downlink data reception or the uplink data transmission.

In Example 30, the method of any of Examples 20-29 further includes that the additional sequence of predetermined configuration parameters for the downlink data reception by the UE or the uplink data transmission from the UE comprises a denser sequence of predetermined configuration parameters than the sequence of predetermined configuration parameters for the DRX operation.

In Example 31, the method of any of Examples 20-30 further includes that the additional sequence of predetermined configuration parameters for the downlink data reception by the UE or the uplink data transmission from the UE comprises a sequence of channel state information.

In Example 32, the method of any of Examples 20-31 further includes that the sequence of channel state information comprises at least one of a sequence of modulation and coding schemes, a sequence of precoding schemes, or a sequence of the number of multiple input multiple output layers.

In Example 33, the method of any of Examples 20-32 further includes transmitting downlink data to the UE or receiving uplink data from the UE, for a duration of time, based on the additional sequence of predetermined configuration parameters; and returning to communicating with the UE based on the sequence of predetermined configuration parameters for the DRX operation following the duration of time.

Example 34 is a device including one or more processors and one or more memories in electronic communication with the one or more processors storing instructions executable by the one or more processors to cause the system or apparatus to implement a method as in any of Examples 20-33.

Example 35 is a system or apparatus including means for implementing a method or realizing an apparatus as in any of Examples 20-33.

Example 36 is a non-transitory computer readable medium storing instructions executable by one or more processors to cause the one or more processors to implement a method as in any of Examples 20-33.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving a configuration from a base station that configures a sequence of predetermined configuration parameters for discontinuous reception (DRX) operation for each of a plurality of DRX cycles based on predetermined state changes for the UE with relation to a communication link with the base station, wherein the DRX operation comprises the plurality of DRX cycles, wherein a configuration parameter of the sequence of predetermined configuration parameters indicates signal strength information corresponding to a wake up signal (WUS) occasion or DRX ON duration of each DRX cycle comprised in the plurality of DRX cycles, wherein corresponding signal strength information from the sequence of predetermined configuration parameters is to be applied during a corresponding WUS occasion or a corresponding DRX ON duration of each DRX cycle, and wherein a first configuration parameter of the sequence of predetermined configuration parameters is different from a second configuration parameter of the sequence of predetermined configuration parameters, the second configuration parameter being of a same type as the first configuration parameter; and
   monitoring for communication from the base station based on the sequence of predetermined configuration parameters for the DRX operation.

2. The method of claim 1, wherein the sequence of predetermined configuration parameters comprises a sequence of beams for patterns of movement in relation with the base station, at least one beam in the sequence of beams being indicated for the UE to use during a corresponding WUS occasion or a corresponding DRX on duration of each DRX cycle comprised in the plurality of DRX cycles.

3. The method of claim 1, wherein the sequence of predetermined configuration parameters comprises time intervals between adjacent WUS occasions or adjacent DRX ON durations comprised in the plurality of DRX cycles.

4. The method of claim 3, wherein the time intervals are non-uniform or at least a subset of the time intervals are uniform.

5. The method of claim 3, wherein the time intervals are based on a distance between adjacent base stations or adjacent remote radio heads along a predetermined path for the UE.

6. The method of claim 1, wherein the signal strength information comprises automatic gain control (AGC) parameters for the WUS occasion or the DRX ON duration of each DRX cycle comprised in the plurality of DRX cycles.

7. The method of claim 1, further comprising:
   receiving at least one of a WUS from the base station in association with the DRX ON duration or a control channel from the base station during the DRX ON duration or transmitting a scheduling request to the base station for uplink transmission; and
   receiving an indication of an additional sequence of predetermined configuration parameters for downlink data reception or uplink data transmission.

8. The method of claim 7, wherein the sequence of predetermined configuration parameters for the DRX operation corresponds to a longer amount of time than the additional sequence of predetermined configuration parameters for the downlink data reception or the uplink data transmission.

9. The method of claim 7, wherein the additional sequence of predetermined configuration parameters for the downlink data reception by the UE or the uplink data transmission from the UE comprises a denser sequence of predetermined configuration parameters than the sequence of predetermined configuration parameters for the DRX operation.

10. The method of claim 7, wherein the additional sequence of predetermined configuration parameters for the downlink data reception by the UE or the uplink data transmission from the UE comprises a sequence of channel state information, wherein the sequence of channel state information comprises at least one of a sequence of modulation and coding schemes, a sequence of precoding schemes, or a sequence of a number of multiple input multiple output layers.

11. The method of claim 7, further comprising:
   receiving downlink data from the base station or transmitting uplink data to the base station for a duration of time based on the additional sequence of predetermined configuration parameters; and returning to monitoring for the communication from the base station based on the sequence of predetermined configuration parameters for the DRX operation following the duration of time.

12. The method of claim 1, wherein the UE applies the sequence of predetermined configuration parameters for the DRX operation during the WUS occasion or the DRX ON duration of each DRX cycle.

13. The method of claim 1, wherein the UE applies the sequence of predetermined configuration parameters for the DRX operation in a repeated manner or for an indicated duration of time.

14. An apparatus for wireless communication at a user equipment (UE), comprising:
at least one memory; and
at least one processor coupled to the at least one memory and configured to:
receive a configuration from a base station that configures a sequence of predetermined configuration parameters for discontinuous reception (DRX) operation for each of a plurality of DRX cycles based on predetermined state changes for the UE with relation to a communication link with the base station, wherein the DRX operation comprises the plurality of DRX cycles, wherein a configuration parameter of the sequence of predetermined configuration parameters indicates signal strength information corresponding to a wake up signal (WUS) occasion or DRX ON duration of each DRX cycle comprised in the plurality of DRX cycles, wherein corresponding signal strength information from the sequence of predetermined configuration parameters is to be applied during a corresponding WUS occasion or a corresponding DRX ON duration of each DRX cycle, and wherein a first configuration parameter of the sequence of predetermined configuration parameters is different from a second configuration parameter of the sequence of predetermined configuration parameters, the second configuration parameter being of a same type as the first configuration parameter; and
monitor for communication from the base station based on the sequence of predetermined configuration parameters for the DRX operation.

15. A method of wireless communication at a base station, comprising:
configuring a user equipment (UE) with a sequence of predetermined configuration parameters for discontinuous reception (DRX) operation for each of a plurality of DRX cycles based on predetermined state changes for the UE with relation to a communication link with the base station, wherein the DRX operation comprises the plurality of DRX cycles, wherein a configuration parameter of the sequence of predetermined configuration parameters indicates signal strength information corresponding to a wake up signal (WUS) occasion or DRX ON duration of each DRX cycle comprised in the plurality of DRX cycles, wherein corresponding signal strength information from the sequence of predetermined configuration parameters is to be applied during a corresponding WUS occasion or a corresponding DRX ON duration of each DRX cycle, and wherein a first configuration parameter of the sequence of predetermined configuration parameters is different from a second configuration parameter of the sequence of predetermined configuration parameters, the second configuration parameter being of a same type as the first configuration parameter; and
transmitting communication to the UE based on the sequence of predetermined configuration parameters for the DRX operation.

16. The method of claim 15, wherein the sequence of predetermined configuration parameters comprises a sequence of beams for patterns of movement in relation with the base station, wherein at least one beam in the sequence of beams is indicated for the UE to use during a corresponding WUS occasion or a corresponding DRX ON duration of each DRX cycle comprised in the plurality of DRX cycles.

17. The method of claim 15, wherein the sequence of predetermined configuration parameters comprises time intervals between adjacent wake up signal (WUS) occasions or adjacent DRX ON durations comprised in the plurality of DRX cycles.

18. The method of claim 17, wherein the time intervals are non-uniform.

19. The method of claim 17, wherein at least a subset of the time intervals are uniform.

20. The method of claim 17, wherein the time intervals are based on a distance between adjacent base stations or adjacent remote radio heads along a predetermined path for the UE.

21. The method of claim 15, wherein the signal strength information comprises automatic gain control (AGC) parameters for the WUS occasion or the DRX ON duration of each DRX cycle comprised in the plurality of DRX cycles.

22. The method of claim 15, wherein the communication comprises at least one of a WUS transmitted to the UE in association with the DRX ON duration, a control channel transmitted to the UE during the DRX ON duration, or a scheduling request received from the UE, the method further comprising:
indicating an additional sequence of predetermined configuration parameters for downlink data reception by the UE or uplink data transmission from the UE.

23. The method of claim 22, wherein the sequence of predetermined configuration parameters for the DRX operation corresponds to a longer amount of time than the additional sequence of predetermined configuration parameters for the downlink data reception or the uplink data transmission.

24. The method of claim 22, wherein the additional sequence of predetermined configuration parameters for the downlink data reception by the UE or the uplink data transmission from the UE comprises a denser sequence of predetermined configuration parameters than the sequence of predetermined configuration parameters for the DRX operation.

25. The method of claim 22, wherein the additional sequence of predetermined configuration parameters for the downlink data reception by the UE or the uplink data transmission from the UE comprises a sequence of channel state information.

26. The method of claim 25, wherein the sequence of channel state information comprises at least one of a sequence of modulation and coding schemes, a sequence of precoding schemes, or a sequence of a number of multiple input multiple output layers.

27. The method of claim 22, further comprising:
transmitting downlink data to the UE or receiving uplink data from the UE, for a duration of time, based on the additional sequence of predetermined configuration parameters; and returning to communicating with the UE based on the sequence of predetermined configuration parameters for the DRX operation following the duration of time.

28. An apparatus for wireless communication at a base station, comprising:
at least one memory; and
at least one processor coupled to the at least one memory and configured to:
configure a user equipment (UE) with a sequence of predetermined configuration parameters for discontinuous reception (DRX) operation for each of a plurality of DRX cycles based on predetermined state changes for the UE with relation to a communication link with the base station, wherein the DRX operation comprises the plurality of DRX cycles, wherein a configuration parameter of the sequence of predetermined configuration parameters indicates signal strength information corresponding to a wake up signal (WUS) occasion or DRX ON duration of each DRX cycle comprised in the plurality of DRX cycles, wherein corresponding signal strength information from the sequence of predetermined configuration parameters is to be applied during a corresponding WUS occasion or a corresponding DRX ON duration of each DRX cycle, and wherein a first configuration parameter of the sequence of predetermined configuration parameters is different from a second configuration parameter of the sequence of predetermined configuration parameters, the second configuration parameter being of a same type as the first configuration parameter; and
transmit communication to the UE based on the sequence of predetermined configuration parameters for the DRX operation.

* * * * *